United States Patent [19]

Ichikawa

[11] Patent Number: 4,605,274
[45] Date of Patent: Aug. 12, 1986

[54] CABLE CONNECTING DEVICE

[75] Inventor: Souji Ichikawa, Sagamihara, Japan

[73] Assignee: Mitutoyo Mfg. Co., Ltd., Tokyo, Japan

[21] Appl. No.: 648,247

[22] Filed: Sep. 7, 1984

[30] Foreign Application Priority Data

Sep. 9, 1983 [JP] Japan .................. 58-166321
Sep. 9, 1983 [JP] Japan .................. 58-166322

[51] Int. Cl.$^4$ ............................................. H01R 13/62
[52] U.S. Cl. ........................... 339/89 R; 339/147 R; 339/94 M
[58] Field of Search ................ 339/94, 89, 90, 177, 339/154 R, 154 A; 285/386-388

[56] References Cited

U.S. PATENT DOCUMENTS

| | | | |
|---|---|---|---|
| 3,017,597 | 1/1962 | Nava et al. | 339/89 M |
| 3,323,096 | 5/1967 | Appelton | 339/89 M |
| 3,816,641 | 6/1974 | Iversen | 339/89 R |
| 3,850,495 | 11/1974 | Glover | 339/94 M |
| 3,920,304 | 11/1975 | Bromberg | 339/94 M |
| 4,249,788 | 6/1982 | McNeel | 339/94 M |
| 4,441,777 | 4/1984 | Harootion | 339/94 M |

Primary Examiner—Gil Weidenfeld
Assistant Examiner—David L. Pirlot
Attorney, Agent, or Firm—Parkhurst & Oliff

[57] ABSTRACT

A cable connecting device is disclosed for detachably, electrically connecting a flexible cable protected by a flexible electric wire tube to a wiring in a component movable within a predetermined scope. The device includes a first cylindrical member enclosingly supporting the first connector with its end portion being exposed connected to an electric circuit in the component; a second connector connected to the first connector and the cable; a second cylindrical member enclosingly supporting the second connector except the end portion and adapted to abut at the end face thereof against the end face of the first cylindrical member when the second connector is coupled to the first connector; a first tightening tubular member threadably coupled to the threaded portion of the first cylindrical member when the first and second cylindrical members are in abutting contact with each other; a first seal member interposed between opposing outer peripheral end faces of the first and second connectors; a second seal member interposed between the inner periphery of the second cylindrical member and the outer periphery of cable enclosed by the second cylindrical member to seal a space formed by the both members at a position of the end portion of the second cylindrical member on the cable's side; and second tightening tubular member engageable with a member on the cable's side and adapted to push the second seal member between the inner periphery of the second cylindrical member and the outer periphery of the cable when the second cylindrical member is threadably coupled.

32 Claims, 4 Drawing Figures

CABLE CONNECTING DEVICE

BACKGROUND OF THE INVENTION

1. Field of the Invention

This invention relates to a cable connecting device, and particularly to improvements in, for example, a cable connecting device for detachably connecting a flexible cable to a component movable within a predetermined scope in a linear type displacement detecting apparatus or the like, the device comprising: a main scale mounted in an elongate case in the longitudinal direction thereof; an index scale disposed along the main scale in opposed relationship thereto in the elongate case in a manner to be movable relative to the main scale in the longitudinal direction of the elongate case; and the component (slider) provided integrally with the index scale outside the elongate case in a manner to be movable relative to the elongate case in the longitudinal direction of the elongate case; wherein a variation in the physical quantity due to a relative movement between the main scale and the index scale is converted into a length measuring electric signal by an electric circuit contained in the component (slider) to be outputted to an external component through a flexible cable.

2. Description of the Prior Art

Figure 1:
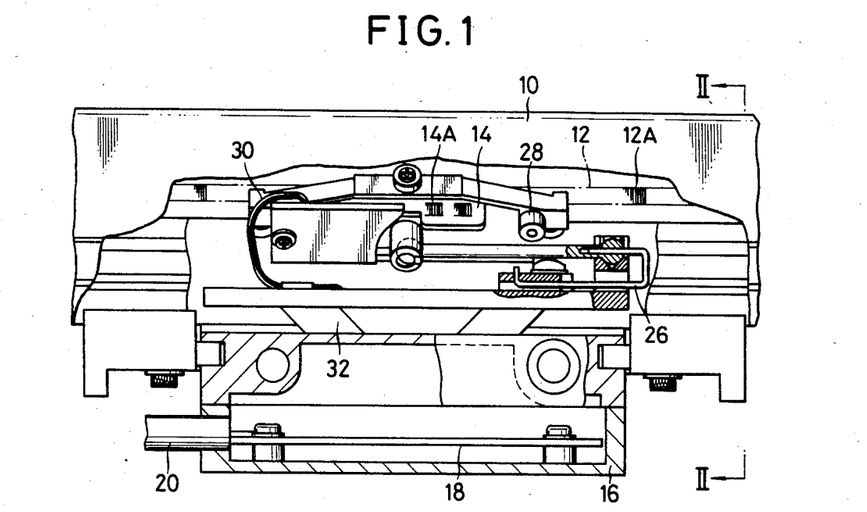
FIG. 1 is a partially sectional front view showing the cable connected state in the conventional linear type displacement detecting apparatus.
Figure 2:
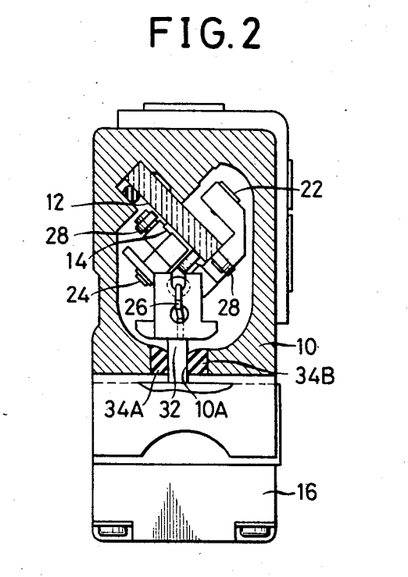
FIG. 2 is a sectional view taken along the line II—II in FIG. 1.

As one of the cable connecting devices of a linear type displacement detecting apparatus for measuring or adjusting a positional relationship between two objects, there has been known a cable connecting device as shown in FIGS. 1 and 2 for example, comprising: a main scale 12 mounted in an elongate case 10 in the longitudinal direction thereof; an index scale 14 disposed along the main scale 12 in opposed relationship thereto in the elongate case 10 in a manner to be movable relative to the main scale 12 in the longitudinal direction of the elongate case 10; and a slider 16 provided integrally with the index scale 14 outside the elongate case in a manner to be movable relative to the elongate case 10 in the longitudinal direction of the elongate case 10; wherein a variation in the physical quantity due to a relative movement between the main scale 12 and the index scale 14 is converted into a length measuring electric singal by an electric circuit 18 contained in the slider 16 to be outputted to an external component, not shown, through a flexible cable 20.

Both of the main scale 12 and the index scale 14 are made of a transparent material such as glass, vertical fringe-like memories 12A and 14A consisting of optical lattices are formed on the opposing surfaces of the both scales, when a light from a light emitting element 22 at one side is transmitted through the main scale 12 and the index scale 14 and reaches a light receiving element 24 provided at the other side, bright and dark fringe patterns are generated between the memories 12A and 14A, the reading of the fringe patterns by the light receiving element 24 makes it possible to read a movement value of a work to be measured.

The bright and dark fringe patterns received by the light receiving element 24 are converted into electric signals, pass through the electric circuit 18 and flexible cable 20, and outputted to the external component, where recording and indicating are effected. Designated at 26 is a wire spring for resiliently pushing the index scale 14 against the main scale 12, 28 rollers for rotatably guiding the index scale 14 on the surfaces of the main scale 12, and 30 a cable for delivering an output signal from the light receiveing element 24 to the electric circuit 18.

Here, the index scale 14 and the slider 16 are connected to each other through an arm 32.

This arm 32 is adapted to move in a longitudinal groove 10A formed in the lower portion of the elongate case 10 as shown in the drawing during a movement of the index scale 14 and the slider 16 relative to the main scale 12. In this case, in order to prevent the intrusion of oil, dust and the like from the outside, the arm 32 is adapted to slide on a pair of seal members 34A and 34B provided on the both sides of the groove 10A, pushing the seal members open.

Thus, the elongate case 10 is isolated from the outside by the seal members 34A and 34B, so that oil, dust and the like are prevented from intruding into the elongate case 10. There have heretofore been such cases where oil, water and the like intrude into the slider 16 to adhere to the electric circuit 18 portion, whereby the electric circuit 18 is adversely affected to emit erroneous signals.

It has been found that the intrusion was caused in such a manner that the oil, water and the like were conveyed on the flexible electric wire tube formed of a mesh or a spiral tube forming an outer skin of the flexible cable 20 and entered the slider 16.

Particularly, when the scales are long, and accordingly, the scope of movement of the slider 16 is extended and the flexible cable 20 is increased in its length, oil and like are disadvantageously allowed to intrude into the slider 16, being conveyed on the outer periphery of the flexible cable 20.

In constrast thereto, there has heretofore been adopted such an arrangement that a connection box is provided at a position spaced apart from the slider 16, opposite ends of a flexible relay cable across the connection box and the slider 16 are firmly seal-bonded, and further, and end portion of a flexible cable connecting the connection box to a measuring apparatus is seal-bonded to the connection box for connection.

Nevertheless, in this case, the relay cable across the slider 16 and the connection box and the cable across the connection box and the external component are each coated by a flexible electric wire tube formed of a metal material, which is called a wire blade or so-called a metal flake (conduit cable) for the protection against damages. However, since these end portions of the wire blades are solidly secured to the slider 16 and the connection box by adhesive bonding or soldering and both the relay cable and the flexible cable are fixed similarly by soldering, such a disadvantage is presented that it becomes very difficult to replace a flexible cable with another when the length of the main scale 12 is to be changed and so forth. Furthermore, during measuring operation, a load to reciprocate the slider 16 is increased due to increased inertia because of increased weight of the connection box, and further, in order to prevent the connection box from colliding on the elongate case 10 and the like, the connection box should be moved together with the slider 16 and be supported by and fixed to a member separate of the member supporting the elongate case 10, thus presenting the disadvantages of additionally requiring increased volume and weight of the device as a whole, and the labor of mounting and sealing works.

Similar disadvantages are presented by the cable connecting device for a flexible cable to be detachably secured to a component in order to take out an output from the component which emits a signal when a touch signal probe or the like in a coordinate measuring instrument is brought into contact with a work to be measured.

SUMMARY OF THE INVENTION

It is therefore the primary object of the present invention to provide a cable connecting device wherein oil and the like are reliably prevented from intruding into a component movable within a predetermined scope without providing another member such as a connection box, and replacement of a flexible cable is facilitated.

Another object of the present invention is to provide a cable connecting device rendered compact in size and light in weight, and a load acting on a component during movement is low.

A further object of the present invention is to provide a cable conncting device capable of being readily electrically shielded through a flexible electric wire tube formed of a metal material without requiring additional works of soldering and the like.

A still further object of the present invention is to provide a cable connecting device capable of easily and reliably mounting thereto or releasing therefrom a flexible cable without requiring works of adhesively bonding a flexible electric wire tube to a component and removing a soldered portion therefrom.

Another object of the present invention is to provide a cable connecting device in a linear type displacement detecting apparatus, wherein oil and the like is reliably prevented from intruding into a slider without providing another member such as a connection box and with no interfering with parts on the main body such as an elongate case, and moreover, replacement of a flexible cable is facilitated.

A further object of the present invention is to provide a cable connecting device in a linear type displacement detecting apparatus, rendered compact in size and light in weight, and a load acting on the detecting apparatus is low during measuring.

A still further object of the present invention is to provide a cable connecting device in a linear type displacement detecting apparatus, capable of easily electrically shielding through a flexible electric wire tube formed of a metal material without requiring works of soldering and the like.

A still more further object of the present invention is to provide a cable connecting device in a linear type displacement detecting apparatus, capable of easily and reliably mounting thereto or releasing therefrom a flexible cable without requiring adhesively bonding a flexible electric wire tube to a component and removing a soldered portion therefrom.

To the above end, the present invention contemplates that, in a cable connecting device for detachably, electrically connecting a flexible cable protected by a flexible electric wire tube to a wiring in a component movable within a predetermined scope, at least the vicinity of a connecting portion of the flexible cable of the component is formed into a hermetically sealed construction except an opening for an electric wiring, and the cable connecting device comprises: a first connector connected to an electric circuit in the component via the opening for an electric wiring and having one of electric contact points; a first cylindrical member formed integrally with the component, enclosingly supporting the first connector with its end portion on the connecting side being exposed, and formed on the outer periphery thereof with a first threaded portion; a second connector capable of being coupled to the first connector and having the other of electric contact points connected to the cable; a second cylindrical member enclosingly supporting the end portion of the cable and the second connector connected thereto except the end portion on the connecting side of the second connector, adapted to abut at the end face thereof against the end face of the first cylindrical member when the second connector is coupled to the first connector, and including a second threaded portion formed on the outer periphery of the end portion thereof on the cable's side and smaller in diameter than the first threaded portion, an outer stepped portion formed on the outer periphery of the end portion thereof on the second connector's side, larger in diameter than the second threaded portion and smaller in diameter than the first threaded portion, and a first inner stepped portion formed on the inner periphery thereof, smaller in diameter than the maximum outer diameter of the second connector enclosed therein, for regulating the movement of the second connector toward the cable; a first tightening tubular member coupled onto the outer periphery of the second cylindrical member, and including a second inner stepped portion having the inner periphery of the end portion thereof on the cable's side, being passable through the second threaded portion, smaller in diameter than the outer stepped portion and adapted to abut against the outer stepped portion to form a lock against dislodging in the direction of the end portion thereof on the second connector's side, and a third threaded portion capable of being threadably coupled to the first threaded portion of the first cylindrical member when the first cylindrical member and the second cylindrical member are in abutting contact with each other; a first seal member interposed between opposing outer peripheral end faces of the first connector and the second connector; a second seal member interposed between the inner periphery of the second cylindrical member and the outer periphery of the cable enclosed by the second cylindrical member to seal a space formed by the both members at a position of the end portion of the second cylindrical member on the cable's side; and a second tightening tubular member including a third inner stepped portion engageable with a member on the cable's side to form a lock against dislodging of the cable and a fourth threaded portion threadably coupled to the second threaded portion of the second cylindrical member and adapted to push the second seal member between the inner periphery of the second cylindrical member and the outer periphery of the cable by the third inner stepped portion when threadably coupled to the second threaded portion.

To the above end, the present invention contemplates that in a cable connecting device in a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and a variation in the physical quantity due to a relative movement between said main scale and said index scale is converted into a length measuring electric signal by an electric circuit contained in said slider to be outputted to an external component through a flexible cable, characterized in that: at least the vicinity of a connecting portion of the flexible cable of said slider is formed into a hermeticlly sealed construction except an opening for an electric wiring, and said cable connecting device further comprises: a first connector connected to said electric circuit contained in said slider via said opening for the electric wiring and having one of electric contact points; a first cylindrical member formed integrally with said slider, enclosingly supporting said first connector with its end portion on the connecting side being exposed, and formed on the outer periphery thereof with a first threaded portion; a second connector capable of being coupled to said first connector and having the other of electic contact points connected to said cable; a second cylindrical member enclosingly supporting the end portion of the cable and the second connector connected thereto except the end portion on the connecting side of the second connector, adapted to abut at the end face thereof against the end face of the first cylindrical member when the second connector is coupled to the first connector, and including a second threaded portion formed on the outer periphery of the end portion thereof on the cable's side and smaller in diameter than the first threaded portion, an outer stepped portion formed on the outer periphery of the end portion thereof on the second connector's side, larger in diameter than the second threaded portion and smaller in diameter than the first threaded portion, and a first inner stepped portion formed on the inner periphery thereof, smaller in diameter than the maximum outer diameter of the second connector enclosed therein, for regulating the movement of the second connector toward the cable; a first tightening tubular member coupled onto the outer periphery of said second cylindrical member, and including a second inner stepped portion having the inner periphery of the end portion thereof on the cable's side being passable through said second threaded portion, smaller in diameter than the outer stepped portion and adapted to abut against said outer stepped portion to form a lock against dislodging in the direction of the end portion thereof on said second connector's side, and a third threaded portion capable of being threadably coupled to said first threaded portion of said first cylindrical member when said first cylindrical member and said second cyulindrical member are in abutting contact with each other; a first seal member interposed between opposing outer peripheral end faces of said first connector and said second connector; a second seal member interposed between the inner periphery of said second cylindrical member and the outer periphery of said cable enclosed by said second cylindrical member to seal a space formed by the both members at a position of the end portion of said second cylindrical member on the cable's side; and a second tightening tubular member including a third inner stepped portion engageable with a member on the cable's side to form a lock against dislodging of said cable and a fourth threaded portion threadably coupled to said second threaded portion of said second cylindrical member and adapted to push said second seal member between the inner periphery of said second cylindrical member and the outer periphery of said cable by said third inner stepped portion when threadably coupled to the second threaded portion.

To the above end, the present invention contemplates that the inner periphery of the second inner stepped portion of the first tightening tubular member is formed into a dead threaded portion threadably coupled to the second threaded portion of the second cylindrical member and passing therethrough in the axial direction.

To the above end, the present invention contemplates that a member on the cable's side, engageable with which the third inner stepped portion of the second tightening tubular member, is formed into a collar portion provided on an end portion of the flexible electric wire tube for enveloping and protecting the cable.

To the above end, the present invention contemplates that an end face of the second cylindrical member on the cable's side is formed into a contact surface for electrically connecting the second cylindrical member to the flexible electric wire tube.

To the above end, the present invention contemplates that the outer periphery of the first connector is brought into contact with the inner periphery of the first cylindrical member through a third seal member.

To the above end, the present invention contemplates that the inner periphery of an end portion of the second cylindrical member on the cable's side is formed into a tapered hole flaring outwardly, and the second seal member is formed into a tapered tubular member to be coupled into the tapered hole.

To the above end, the present invention contemplates that the component is formed into a separate type wherein a portion thereof having the first cylindrical member is mountable to or detachable from a portion on the main body's side through a seal member.

To the above end, the present invention contemplates that the lines of external shapes of the first and second tightening tubular members are closer to the center of the component than the lines of external shapes which otherwise would be spaced most apart from the center of the component in a direction perpendicular to the moving direction of the component.

To the above end, the present invention contemplates that said slider is formed into a separate type, in which a portion thereof having said first cylindrical member is mountable to or detachable from a portion on the main body's side through a seal member.

To the above end, the present invention contemplates that the lines of external shapes of said first and said second tightening tubular members are closer to the center of said slider than the lines of external shapes which otherwise would be spaced most apart from the center of said slider in a direction perpendicular to the moving direction of said slider.

DETAILED DESCRIPTION OF THE PREFERRED EMBODIMENT

Description will hereunder be given of one embodiment of the present invention with reference to the accompanying drawings.

In this embodiment, same reference numerals in FIGS. 1 and 2 are used to designate same or similar parts corresponding to ones as shown in FIGS. 1 and 2, so that the detailed description need not be repeated.

Figure 3:
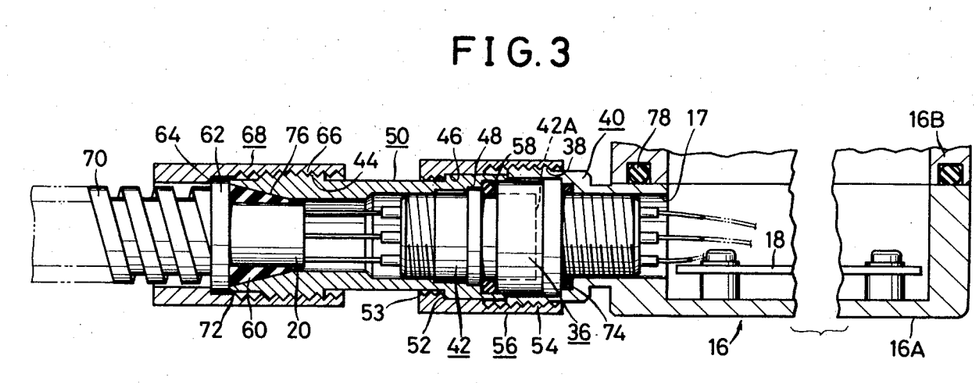
FIG. 3 is a sectional view showing the essential portions of one embodiment of the cable connecting device according to the invention.
Figure 4:
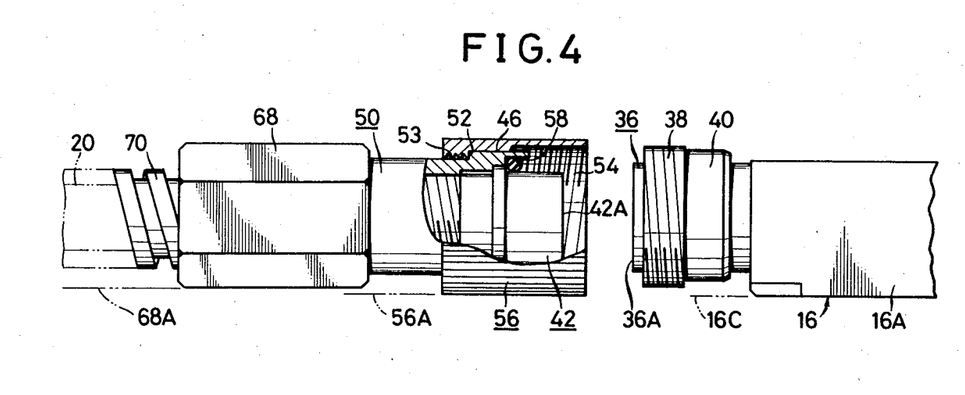
FIG. 4 is a partially sectional front view showing the above embodiment with the essential portions disassembled.

According to this embodiment, a cable connecting device of a linear type displacement detecting apparatus, as shown in FIGS. 1 and 2, comprise: a main scale 12 mounted in an elongate case 10 in the longitudinal direction thereof; an index scale 14 disposed along the main scale 12 in opposed relationship thereto in the elongate case 10 in a manner to be movable relative to the main scale 12 in the longitudinal direction of the elongate case 10; and a slider 16 provided integrally with the index scale 14 outside the elongate case 10 in a manner to be movable relative to the elongate case 10 in the longitudinal direction of the elongate case 10; wherein a variation in the physical quantity due to a relative movement between the main scale 12 and the index scale 14 is converted into a length measuring electric signal by an electric circuit 18 contained in the slider 16 to be outputted to an external component through a flexible cable 20, as shown in FIGS. 3 and 4. The slider 16 is formed into a hermetically sealed construction except an opening 17 for an electric wiring. The cable connecting device comprises: a first connector 36 connected to the electric circuit 18 in the slider 16 via the opening 17 for an electric wiring and having one of electric contact points; a first cylindrical member 40 formed integrally with the slider 16 enclosingly supporting the first connector 36 with its end portion 36A on the connecting side being exposed, and formed on the outer periphery thereof with a first threaded portion 38; a second connector 42 capable of being coupled to the first connector 36 and having the other of electric contact points connected to the cable 20; a second cylindrical member 50 enclosingly supporting the end portion of the cable 20 and the second connector 42 connected thereto except the end portion on the connecting side of the second connector 42, adapted to abut at the end face thereof against the end face of the first cylindrical member 40 when the second connector 42 is coupled to the first connector. The second cylindrical member 50 includes a second threaded portion 44 formed on the outer periphery of the end portion thereof on the side of the cable 20 and smaller in diameter than the first threaded portion 38, an outer stepped portion 46 formed on the outer periphery of the end portion thereof on the side of the second connector 42, larger in diameter than the second threaded portion 44 and smaller in diameter than the first threaded portion 38, and a first inner stepped portion 48 formed on the inner periphery thereof, smaller in diameter than the maximum outer diameter of the second connector 42 enclosed therein, for regulating the movement of the second connector 42 toward the cable 20. A first tightening tubular member 56 is coupled onto the outer periphery of the second cylindrical member 50, and includes a second inner stepped portion 52 having the inner periphery of the end portion thereof on the side of the cable 20, being passable through the second threaded portion 44, smaller in diameter than the outer stepped portion 46 and adapted to abut against the outer stepped portion 46 to form a lock against dislodging in the direction of the end portion thereof on the side of the second connector 42, and a third threaded portion 54 capable of being threadably coupled to the first threaded portion 38 of the first cylindrical member 40 when the first cylindrical member 40 and the second cylindrical member 50 are in abutting contact with each other. A first seal member 58 is interposed between opposing outer peripheral end faces of the first connector 36 and the second connector 42; a second seal member 60 is interposed between the inner periphery of the second cylindrical member 50 and the outer periphery of the cable 20 enclosed by the second cylindrical member 50 to seal a space formed by the both members at a position of the end portion of the second cylindrical member 50 on the side of the cable 20. A second tightening tubular member 68 includes a third inner stepped portion 64 engageable with a member 62 on the side of the cable 20 and a fourth threaded portion 66 threadably coupled to the second threaded portion 44 of the second cylindrical member 50 and adapted to push the second seal member 60 between the inner periphery of the second cylindrical member 50 and the outer periphery of the cable 20 by the third inner stepped portion 64 when threadably coupled to the second threaded portion 44.

The inner periphery of the second inner stepped portion 52 of the first tightening tubular member 56 is formed into a dead threaded portion 53 threadably coupled to the second threaded portion 44 of the second cylindrical portion 50 and passing therethrough in the axial direction.

A member 62 on the side of the cable 20, with which the third inner stepped portion 64 of the second tightening tubular member 56 is engaged, is formed into a collar portion provided on an end portion of the flexible electric wire tube 70 for enclosing and protecting the cable 20.

An end face of the second cylindrical member 50 on the side of the cable 20 is formed into a contact surface 72 for electrically connecting the second cylindrical member 50 to the flexible electric wire tube 70.

The outer periphery of the first connector 36 is brought into contact with the inner periphery of the first cylindrical member 40 through a third seal member 74 consisting of an O-ring.

The inner periphery of an end portion of the second cylindrical member 50 on the side of the cable 20 is formed into a tapered hole 76 flaring outwardly, and the second seal member 60 is formed into a tapered tubular member to be coupled into the tapered hole 76.

More specifically, the second seal member 60 as being the tapered tubular member is pushed into the tapered hole 76 by the collar portion 62 formed on an end portion of the flexible electric wire tube 70, so that the second seal member 60 can be elastically, pressingly attached to the outer periphery of the cable 20 and the inner periphery of the second cylindrical member 50 inside the tapered hole 76, thereby enabling the achievement of sealing therebetween.

Furthermore, in this embodiment, the slider 16 is formed into a separate type wherein a portion 16A thereof to be separated, having the first cylindrical member 40 is mountable to or detachable from a portion 16B on the main body's side through a seal member 78.

The lines of external shapes of the first and second tightening tubular members 56 and 68 are closer to the elongate case 10 than the lines of external shapes spaced most apart from the elongate case 10 in a direction perpendicular to the moving direction of the slider 16.

More specifically, moving paths 56A and 68A of the first and second tightening tubular members 56 and 68 in the longitudinal direction of the elongate case 10 are closer to the elongate case 10 (inwardly) than a moving path 16C of the slider 16 as shown at the bottom portion of the drawing, so that the first and second tightening tubular members 56 and 68 do not interfere with other portions.

Description will hereunder be given of the case of mounting the flexible cable 20 to the slider 16.

Firstly, in advance, the first tightening tubular member 56 and the second tightening tubular member 68 are loosely coupled to the flexible electric wire tube 70 enveloping the flexible cable 20, subsequently, the dead threaded portion 53 at the second inner stepped portion 52 of the first tightening tubular member 56 is threadably coupled to the third threaded portion 54, caused to pass through this third threaded portion 54 and pushed in the direction of the second connector 42.

In this state, the fourth threaded portion 66 of the second tightening tubular member 68 is threadably coupled to the second threaded portion 44 of the second cylindrical member 50. At this time, the third inner stepped portion 64 of the second tightening tubular member 68 engages the flexible electric wire tuber 70 to push the same in the direction of the tapered hole 76.

With the above arrangement, the second seal member 60 is coupled into the tapered hole 76 and strongly squeezed between the inner periphery of the tapered hole 76 and the outer periphery of the end portion of the flexible cable 20 to provide a firm seal therebetween. Furthermore, at this time, the collar portion 62 formed on the flexible electric wire tube 70 formed of a metal material is pushed by the contact surface 72 formed on the end portion of the second cylindrical member 50 to electrically connect the both members to each other.

Subsequently, the second connector 42 enclosed in the end portion of the second cylindrical member 50 is coupled to the first connector 36 enclosed in the first cylindrical member 40. In this state, the third threaded portion 54 on the inner side of the first tightening tubular member 56 is threadably coupled to the first threaded portion 38 one the outer periphery of the first cylindrical member 40 and fixed thereto.

At this time, the second inner stepped portion 52 of the first tightening tubular member 56 engages the outer stepped portion 46 of the second cylindrical member 50 in the axial direction and pushes the same in the direction of the first cylindrical member 40.

In consequence, the end face of the second cylindrical member 50 is firmly pushed against the end face of the first cylindrical member 40.

Then, the first seal member 58 interposed between the opposing end faces of the first connector 36 and the second connector 42 is pushed in the axial direction and brought into pressing contact with the both members, thus sealing therebetween.

In this case, an axial relative displacement between the first cylindrical member 40 and the second cylindrical member 50 is regualted by the abutting end faces of the both members, so that the pressing force against the first seal member 58 cannot be excessively high. Similarly, the third seal member 74 interposed between the outer periphery of the first connector 36 and the inner periphery of the first cylindrical member 40 seals between the both members and the pressing force against the third seal member 74 cannot be excessively high.

Here, the separate portion 16A of the slider 16 of the separate type may be mounted to the portion 16B on the main body's side after the flexible cable 20 has been secured. Or, the flexible cable 20 may be mounted to the separate portion 16A in the state of being secured to the portion 16B on the main body's side in advance as described above.

In this embodiment, the third seal member 74 seals between the first connector 36 and the first cylindrical member 40, the first seal member 58 seals between the first connector 36 and the second connector 42 and between these two members and the inner periphery of the second cylindrical member 50, and the second seal member 60 seals between the flexible cable 20 and the second cylindrical member 50, so that oil, water and the like conveyed on the outer periphery of the flexible elctric wire tube 70 or adhered to the outer peripheries of the first cylindrical member 40, second cylindrical member 50, first tightening tubular member 56 and second tightening tubular member 68 can be reliably prevented from intruding into the slider 16.

Moreover, to change the scope of measuring of the scales, the flexible cable 20 can be readily replaced with another one by mounting or releasing the first tightening tubular member 56.

Further, the values of projection of these cylindrical members and tightening tubular members to the outside from the elongate case 10 can prevent these members from colliding on other portions at the time of movement of the slider 16 during measuring operation because the values of projection remain inwardly of the moving path 16C of the line of external shape of the slider 16.

The above advantage is obtained particularly due to the fact that the dead threaded portion 53 of the first tightening tubular member 56 is threadably coupled to the second threaded portion 44 of the second cylindrical member 50 and is made passable therethrough, whereby the outer diameter of the first tightening tubular member 56 is minimized.

Furthermore, with the above arrangement, the first and second tightening tubular members 56 and 68 are prevented from dislodging from the second cylindrical member 50 even when the tubular members 56 and 68 are detached from the first cylindrical member 40, so that the missing of the tubular members can be avoided.

Further, the end face of the second cylindrical member 50 on the side of the flexible cable 20 is formed into the contact surface 72 electrically contacted by the collar portion 62 of the flexible electric wire tube 70 and the collar portion 62 is firmly pushed, so that the shield-earthing can be reliably obtained.

Furthermore, in this embodiment, the flexible electric wire tube 70 is firmly tightened onto the second cylindrical member 50 by the second tightening tubular member 68 through the collar portion 62 thereof and fixed thereto, and moreover, the mounting and releasing are easily effected, so that necessity for the works of soldering, removal of soldered portion and the like as in the prior art can be eliminated and the sealing can be made reliable by the second seal member 60.

Here, it is conceivable that the tightening nuts and the like on the market may be utilized in place of the first and second tightening tubular members 56 and 68. However, in this case, for example, lack of the dead threaded portion 53 and the like results in an increased outer diameter, whereby the lines of outer shapes of the tightening nuts and the like bulge outwardly from the line of outer shape of the slider 16.

In this embodiment, the slider 16 is of the separate type wherein the slider 16 is divided into two parts including the separate portion 16A integrally formed with the first cylindrical member 40 and the portion 16B on the main body's side, to which the separate portion 16A is secured, whereby, in mounting the electric circuit 18 or the flexible cable 20, the separate portion 16A and the portion 16B are suitably secured to or released from each other, thus improving the workability.

Furthermore, in the above embodiment, the third seal member 74 seals between the outer priphery of the first connector 36 and the first cylindrical member 40, however, the third seal member 74 may be dispensed with only if the position of the first seal member 58 coincides with the position of the abutting faces of the first cylindrical member 40 and the second cylindrical member 50, whereby the first seal member 58 seals between the first and second connectors 36 and 42 and between the first and second cylindrical members 48 and 50.

For example, if the first cylindrical member 40 additionally functions as the casing of the first connector 36, then the third seal member 74 may be dispensed with.

Further, the second seal member 60 is formed into a tapered tubular member, however, the application of the present invention need not limited to this, and any other shapes may be adopted to the second seal member 60.

Furthermore, in the above embodiment, the second seal member 60 is pushed by the collar portion of the movable electric wire tube 70, however, the pushing may be effected by a member on the side of the flexible cable 20.

In consequence, in this case, such an arrangement should be adopted that the member on the side of the flexible cable 20 is pushed by the third inner stepped portion 64 of the second tightening tubular member 68.

Furthermore, in the above embodiment, the flexible cable 20 is covered by the flexible electric wire tube 70, however, the flexible electric wire tube 70 need not be limited to the spiral shape as shown, and may be a mesh shape for example.

Furthermore, the material of the flexible electric wire tube 70 need not be limited to the metal, and may be synthetic resin and the like for example. In this case, in order to secure the electrically shielded earthing of the slider 16, it is necesssary to provide another shielded earth member.

The above embodiment relates to a so-called photoelectric type displacement detecting apparatus wherein optical lattices are formed on the main scale 12 and the index scale 14, respectively. The bright and dark fringe patterns generated when the both scales move relative to each other are converted into electric signals by the light receiving element 24. However, the application of the present invention need not be limited to this, and any arrangement may be adopted only if a dimension or the like may be measured on the basis of a variation in the physical quantity between the main scale and the index scale which move relative to each other. In consequence, for example, the present invention is applicable to displacement detecting apparatus including the electrostatic type, electromagnetic type, contact point type, and resistance type.

The above embodiment is concerned with the displacement detecting apparatus, however, the scope of application of the present invention need not be limited to this, and the present invention is generally applicable to the cable connecting device for detachably connecting a flexible cable to a component movable within a predetermined scope.

In consequence, for example, the present invention is widely applicable to a cable connecting divice for connecting a flexible cable to a touch signal probe in a coordinate measuring instrument, a cable connecting device for connecting a flexible cable to take out signals from a sensor in an industrial robot to the industrial robot and so forth.

In this case, it is not necessary to form the component as a whole into a hermetically sealed construction, and, at least the vicinity of the connecting portion of the flexible cable (slider 16 portion in the above embodiment) should be formed into the hermetically sealed construction.

The present invention with the above arrangement is outstandingly advantageous in that oil, water and the like can be reliably prevented from intruding into the movable component (slider) without requiring increased volume and weight of the device, and the flexible cable can be very easily mounted to or released from the device.

The experiments conducted by the inventor of the present invention proved that oil and water were prevented from intruding into the device in the dipping tests.

What is claimed is:

1. A cable connecting device for detachably, electrically connecting a flexible cable protected by a flexible electric wire tube to a wiring in a component movable in a moving direction within a predetermined scope relative to a main body, the component having a first portion opposite the main body and a second portion disposed between the first portion and the main body, the first portion defining an outer periphery at a travelling distance from the main body in a normal direction perpendicular to the moving direction, wherein at least the vicinity of a connecting portion of the flexible cable of said component is formed into a hermetically sealed construction except for an opening for an electric wiring, said cable connecting device comprising:

a first connector connected to an electric circuit in said component via the opening for the electric wiring and having a first end portion on a first connecting side opposite said component, the first connector having at least one electric contact point;

a first cylindrical member formed integrally with said component, enclosingly supporting the first connector with its first end portion on the first connecting side being exposed, an outer periphery of the first cylindrical member being formed with a first threaded portion;

a second connector capable of being coupled to the first connector and having at least one opposite electric contact point connected to the cable;

a second cylindrical member enclosingly supporting an end portion of the cable and having a second end portion on a second connecting side opposite the cable, the second connector being connected to the second cylindrical member except for the second end portion on the second connecting side of the second connector, an end face of the second cylindrical member being adapted to abut against an end face of the first cylindrical member when the second connector is coupled to the first connector, the second cylindrical member including a second threaded portion formed on an outer periphery of a third end portion on the second cylindrical member opposite the second end portion and adjacent the cable, the second threaded portion being smaller in diameter than the first threaded portion, an outer stepped portion formed on an outer periphery of the second end portion, the outer stepped portion being larger in diameter than the second threaded portion and smaller in diameter than the first threaded portion, and a first inner stepped portion formed on an inner periphery of the second cylindrical member, the first inner stepped portion being smaller in diameter than a maximum outer diameter of the second connector enclosed therein for regulating the movement of the second connector toward the cable;

a first tightening tubular member coupled onto the outer periphery of the second cylindrical member, the first tightening tubular member having an end portion adjacent the cable and an opposite end portion adjacent the second connector, the first tightening tubular member including a second inner stepped portion having an inner periphery of the end portion adjacent the cable being passable through the second threaded portion, smaller in diameter than the outer stepped portion, and adapted to abut against the outer stepped portion for form a lock against dislodging in the direction of the end portion adjacent of the second connector, and a third threaded portion capable of being threadably coupled to the first threaded portion of the first cylindrical member when the first cylindrical member and the second cylindrical member are in abutting contact with each other;

a first seal member interposed between opposing outer peripheral end faces of the first connector and the second connector;

a second seal member interposed between the inner periphery of the second cylindrical member and an outer periphery of the cable enclosed by the second cylindrical member to seal a space formed therebetween at a position of the third end portion of the second cylindrical member; and a second tightening tubular member including a third inner stepped portion engageable with a stop member on an outer periphery of the cable to form a lock against dislodging the cable and a fourth threaded portion threadably coupled to the second threaded portion of the second cylindrical member, the third inner stepped portion engaging the stop member when the fourth threaded portion is threadably coupled to the second threaded portion to push the second seal member between the inner periphery of the second cylindrical member and the outer periphery of the cable, the outer periphery of both the first and second tightening tubular members defining first and second distances, respectively, from the main body in the normal direction, the first and second distances being less than the travelling distance of the component from the main body, the first portion of the component being detachable from the second portion and including a seal and the first cylindrical member.

2. A cable connecting device as set forth in claim 1, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

3. A cable connecting device as set forth in claim 1, wherein the inner periphery of the second inner stepped portion of said first tightening tubular member is formed into a dead threaded portion to be threadably coupled to the second threaded portion and pass therethrough in an axial direction thereof.

4. A cable connecting device as set forth in claim 3, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

5. A cable connecting device as set forth in claim 1, wherein the stop member on the cable, which is engageable with the third inner stepped portion of said second tightening tubular member, is formed into a collar portion provided on the end of said flexible electric wire tube, for enclosing and protecting said cable, the collar portion pushing the second seal member toward the second cylindrical member, and the third end face of said second cylindrical member is formed into a contact surface brought into contact with said collar portion to electrically connect said second cylindrical member to said flexible electric wire tube.

6. A cable connecting device as set forth in claim 5, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

7. A cable connecting device as set forth in claim 3, wherein the stop member on the cable, which is engageable with the third inner stepped portion of said second tightening tubular member is formed into a collar portion provided on the end of said flexible electric wire tube, for enclosing and protecting said cable, the collar portion pushing the second seal member toward the second cylindrical member, and the third end face of said second cylindrical member is formed into a contact surface brought into contact with said collar portion to electrically connect said second cylindrical member to said flexible electric wire tube.

8. A cable connecting device as set forth in claim 7, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

9. A cable connecting device as set forth in claim 1, wherein an outer periphery of said first connector is brought into contact with an inner periphery of said first cylindrical member through a third seal member interposed between a first connector and the first cylindrical member.

10. A cable connecting device as set forth in claim 9, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

11. A cable connecting device as set forth in claim 3, wherein an outer periphery of said first connector is brought into contact with an inner periphery of said first cylindrical member through a third seal member interposed between the first connector and the first cylindrical member.

12. A cable connecting device as set forth in claim 11 said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

13. A cable connecting device as set forth in claim 5, wherein an outer periphery of said first connector is brought into contact with an inner periphery of said first cylindrical member through a third seal member interposed between the first connector and the first cylindrical member.

14. A cable connecting device as set forth in claim 13, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

15. A cable connecting device as set forth in claim 7, wherein an outer periphery of said first connector is brought into contact with an inner periphery of said first cylindrical member through a third seal member interposed between the first connector and the first cylindrical member.

16. A cable connecting device as set forth in claim 15, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

17. A cable connecting device as set forth in claim 1, wherein the inner periphery of the third end portion on a cable side of said second cylindrical member is formed into a tapered hole flaring outwardly and said second seal member is formed into a tapered tubular member to be coupled into said tapered hole.

18. A cable connecting device as set forth in claim 17, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

19. A cable connecting device as set forth in claim 3, wherein the inner periphery of the third end portion on a cable side of said second cylindrical member is formed into a tapered hole flaring outwardly and said second seal member is formed into a tapered tubular member to be coupled into said tapered hole.

20. A cable connecting device as set forth in claim 19, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

21. A cable connecting device as set forth in claim 5, wherein the inner periphery of the third end portion on a cable side of said second cylindrical member is formed into a tapered hole flaring outwardly and said second seal member is formed into a tapered tubular member to be coupled into said tapered hole.

22. A cable connecting device as set forth in claim 21, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

23. A cable connecting device as set forth in claim 7, wherein the inner periphery of the third end portion on a cable side of said second cylindrical member is formed into a tapered hole flaring outwardly and said second seal member is formed into a tapered tubular member to be coupled into said tapered hole.

24. A cable connecting device as set forth in claim 23, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

25. A cable connecting device as set forth in claim 9, wherein the inner periphery of the third end portion on a cable side of said second cylindrical member is formed into a tapered hole flaring outwardly and said second seal member is formed into a tapered tubular member to be coupled into said tapered hole.

26. A cable connecting device as set forth in claim 25, wherein said component is a slider of a linear type displacement detecting apparatus, comprising: a main scale mounted in an elongate case in the longitudinal direction thereof; and index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

27. A cable connecting device as set forth in claim 11, wherein the inner periphery of the third end portion on a cable side of said second cylindrical member is formed into a tapered hole flaring outwardly and said second seal member is formed into a tapered tubular member to be coupled into said tapered hole.

28. A cable connecting device as set forth in claim 27, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

29. A cable connecting device as set forth in claim 13, wherein the inner periphery of the third end portion on a cable side of said second cylindrical member is formed into a tapered hole flaring outwardly and said second seal member is formed into a tapered tubular member to be coupled into said tapered hole.

30. A cable connecting device as set forth in claim 29, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

31. A cable connecting device as set forth in claim 15, wherein the inner periphery of the third end portion on a cable side of said second cylinderical member is formed into a tapered hole flaring outwardly and said second seal member is formed into a tapered tubular member to be coupled into said tapered hole.

32. A cable connecting device as set forth in claim 31, wherein said component is a slider of a linear type displacement detecting apparatus, comprising: a main scale mounted in an elongate case in the longitudinal direction thereof; an index scale disposed along said main scale in opposed relationship thereto in said elongate case in a manner to be movable relative to said main scale in the longitudinal direction of said elongate case; and said slider provided integrally with the index scale outside the elongate case in a manner to be movable relative to the elongate case in the longitudinal direction of the elongate case; wherein a variation in the physical quantity due to a relative movement between said main scale and said index scale is converted into a length measuring electric signal by said electric circuit contained in said slider to be outputted to an external component through said flexible cable.

* * * * *